US010525860B2

(12) United States Patent
Matzka et al.

(10) Patent No.: US 10,525,860 B2
(45) Date of Patent: Jan. 7, 2020

(54) SEATING SYSTEM FOR A VEHICLE

(71) Applicant: Lear Corporation, Southfield, MI (US)

(72) Inventors: Thomas Matzka, Oberding (DE); Josef Widhopf, Oberding (DE); Uwe Hoyer, Oberding (DE); Markus Manternach, Oberding (DE)

(73) Assignee: Lear Corporation, Southfield, MI (US)

( * ) Notice: Subject to any disclaimer, the term of this patent is extended or adjusted under 35 U.S.C. 154(b) by 175 days.

(21) Appl. No.: 15/638,992

(22) Filed: Jun. 30, 2017

(65) Prior Publication Data

US 2018/0105079 A1 Apr. 19, 2018

(30) Foreign Application Priority Data

Oct. 18, 2016 (DE) .......................... 10 2016 220 330

(51) Int. Cl.
B60N 2/90 (2018.01)
B60N 2/20 (2006.01)
B60N 2/22 (2006.01)
B60N 2/68 (2006.01)

(52) U.S. Cl.
CPC .............. B60N 2/943 (2018.02); B60N 2/20 (2013.01); B60N 2/224 (2013.01); B60N 2/2245 (2013.01); B60N 2/68 (2013.01)

(58) Field of Classification Search
CPC .......... B60N 2/20; B60N 2/933; B60N 2/224; B60N 2/919; B60N 2/943; B60N 2/68; B60N 2/2245; B60N 2/235
USPC .................................................... 297/378.12
See application file for complete search history.

(56) References Cited

U.S. PATENT DOCUMENTS

| 7,118,171 | B2 | 10/2006 | Fowler et al. |
| 7,393,056 | B2 * | 7/2008 | O'Connor .......... B60N 2/01583 296/65.16 |
| 8,197,001 | B2 | 6/2012 | Grable et al. |
| 8,888,186 | B2 * | 11/2014 | Otsuka ..................... B60N 2/22 297/378.12 |

(Continued)

FOREIGN PATENT DOCUMENTS

| DE | 102011082070 A1 | 3/2013 |
| DE | 102015200495 A1 | 7/2016 |
| FR | 2817205 A1 | 5/2002 |

OTHER PUBLICATIONS

Office Action in German Patent Application No. 10 2016 220 330.4 dated Jan. 8, 2018.

Primary Examiner — Milton Nelson, Jr.
(74) Attorney, Agent, or Firm — Brooks Kushman P.C.

(57) ABSTRACT

A seating system for a vehicle includes a seat cushion and a seat back pivotably attached to the seat cushion. A latch arrangement has a locked position for inhibiting pivoting of the seat back relative to the seat cushion and an open position for facilitating pivoting of the seat back relative to the seat cushion. A rotatable actuator defines a first radius and a second radius. A first flexible member is attached to the rotatable actuator at the first radius such that tensioning the first flexible member rotates the rotatable actuator in a first direction. A second flexible member is attached to the latch arrangement and the rotatable actuator at the second radius such that rotation of the rotatable actuator in the first direction tensions the second flexible member and moves the latch arrangement from the locked position to the open position.

20 Claims, 4 Drawing Sheets

(56) References Cited

U.S. PATENT DOCUMENTS

| | | | |
|---|---|---|---|
| 9,809,135 B2* | 11/2017 | Elton | B60N 2/933 |
| 2001/0028189 A1* | 10/2001 | Klein | B60N 2/20 |
| | | | 297/378.12 |
| 2007/0152487 A1 | 7/2007 | Brockman et al. | |
| 2011/0115274 A1* | 5/2011 | Hazlewood | B60N 2/12 |
| | | | 297/378.12 |
| 2012/0153699 A1 | 6/2012 | Dumont | |
| 2015/0266402 A1 | 9/2015 | Lutzka | |

* cited by examiner

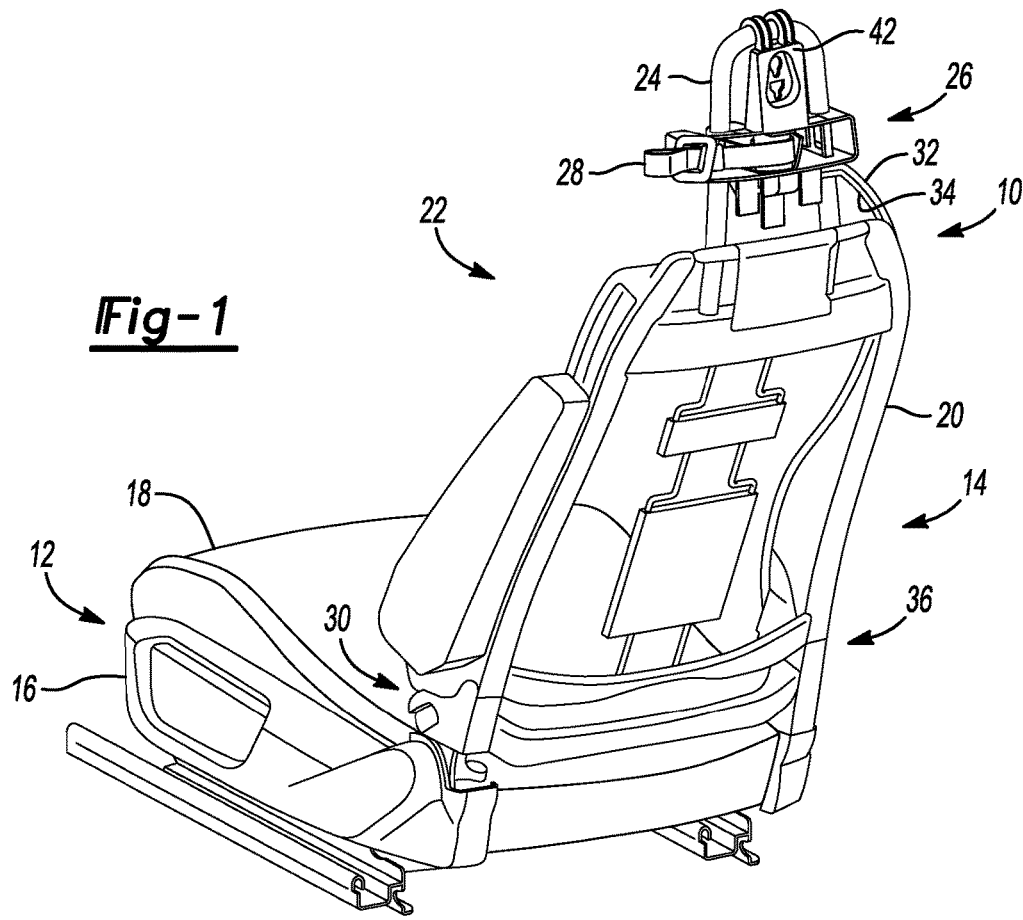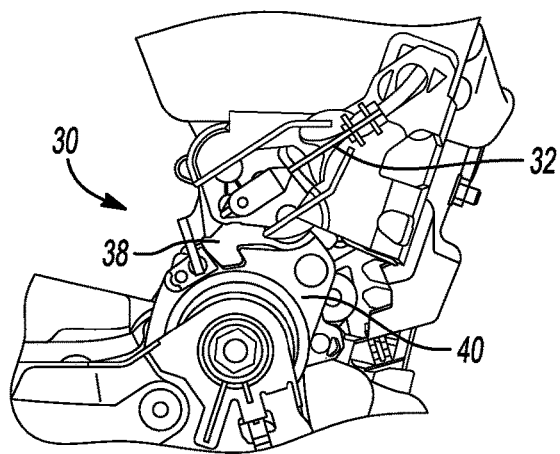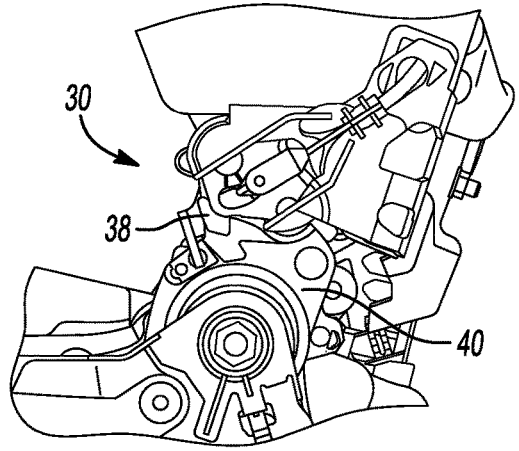

SEATING SYSTEM FOR A VEHICLE

CROSS-REFERENCE TO RELATED APPLICATIONS

This application claims foreign priority benefits under 35 U.S.C. § 119(a)-(d) to DE 10 2016 220 330.4, filed Oct. 18, 2016, the disclosure of which is hereby incorporated by reference in its entirety.

TECHNICAL FIELD

The present disclosure relates to a seating system for a vehicle.

BACKGROUND

There are many types of vehicle seating systems, some of which include a seat back that folds forward relative to a seat cushion. In at least some designs, a lever may be used to facilitate the fold-forward function, and the lever may be inconveniently located, difficult to actuate, or both. In addition, it may be necessary to keep an inventory of right-hand and left-hand levers and their connecting elements to accommodate both left-side seats and right-side seats, because the elements may not be interchangeable. Therefore, it would be desirable to have a seating system for a vehicle that overcame some or all of these limitations.

SUMMARY

Embodiments described herein may include a seating system for a vehicle that includes a seat cushion and a seat back pivotably attached to the seat cushion. A latch arrangement has a locked position for inhibiting pivoting of the seat back relative to the seat cushion and an open position for facilitating pivoting of the seat back relative to the seat cushion. A release arrangement includes a first pulley rotatable around an axis, a second pulley connected to the first pulley and rotatable around the axis, a flexible elongate member wrapped around at least a portion of the first pulley, and a cable wrapped around at least a portion of the second pulley. The cable has a portion attached to the latch arrangement such that tensioning the flexible elongate member rotates the first and second pulleys in a first direction and tensions the cable to move the latch arrangement from the locked position to the open position.

Embodiments described herein may include a seating system for a vehicle that includes a seat cushion and a seat back pivotably attached to the seat cushion. A latch arrangement has a locked position for inhibiting pivoting of the seat back relative to the seat cushion and an open position for facilitating pivoting of the seat back relative to the seat cushion. A rotatable actuator defines a first radius and a second radius. A first flexible member is attached to the rotatable actuator at the first radius such that tensioning the first flexible member rotates the rotatable actuator in a first direction. A second flexible member is attached to the latch arrangement and the rotatable actuator at the second radius such that rotation of the rotatable actuator in the first direction tensions the second flexible member and moves the latch arrangement from the locked position to the open position.

Embodiments described herein may include a seating system for a vehicle that includes a seat cushion and a seat back pivotably attached to the seat cushion. A latch arrangement is operable between a locked position for inhibiting pivoting of the seat back relative to the seat cushion and an open position for facilitating pivoting of the seat back relative to the seat cushion. A release arrangement is operable to move the latch arrangement between the locked position and the open position. The release arrangement includes an actuator having a first step defining a first radius and a second step defining a second radius. A first flexible member is attached to the first step such that tensioning the first flexible member rotates the actuator around an axis in a first direction. A second flexible member is attached to the second step and the latch arrangement such that rotation of the actuator in the first direction around the axis tensions the second flexible member and operates the latch arrangement.

Embodiments described herein may include a head restraint for a seating system for a vehicle. The head restraint includes an actuator having a first step defining a first radius and a second step defining a second radius. A first flexible member is attached to the first step such that tensioning the first flexible member rotates the actuator around an axis in a first direction. A second flexible member is attached to the second step such that rotation of the actuator in the first direction around the axis tensions the second flexible member.

BRIEF DESCRIPTION OF THE DRAWINGS

FIG. 1 shows a seating system for a vehicle in accordance with embodiments described herein;

FIG. 2A shows a latch arrangement for the vehicle seat shown in FIG. 1 with the latch arrangement in a locked position;

FIG. 2B shows the latch arrangement in a open position;

DETAILED DESCRIPTION

Figure 3:
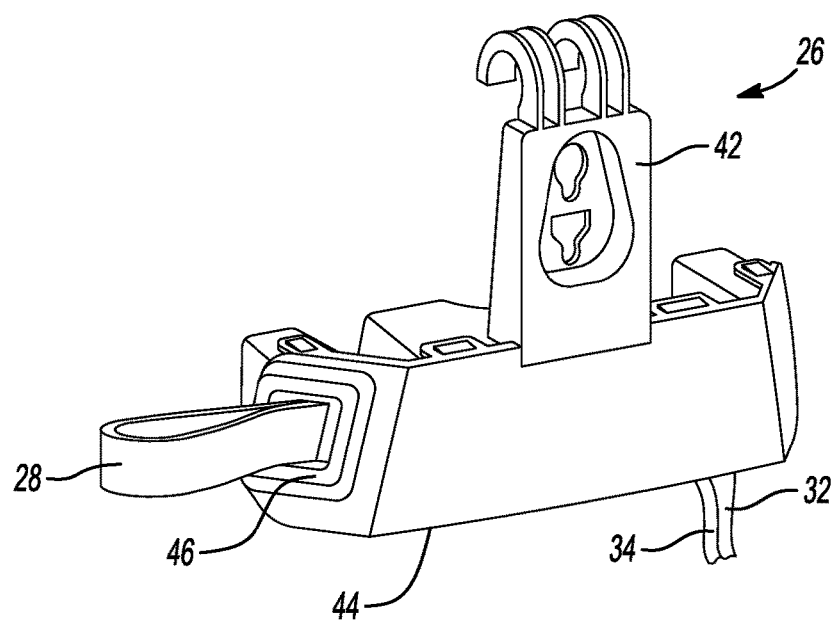
FIG. 3 shows a perspective view of a release arrangement making up a part of the seating system shown in FIG. 1

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a seating system 10 for a vehicle in accordance with embodiments described herein. The seating system 10 includes a seat cushion 12 and a seat back 14 pivotably attached to the seat cushion 12. As shown in FIG.

1, the seat cushion 12 includes a seat cushion frame 16 and a seat cushion pad 18. In contrast, FIG. 1 only shows a seat back frame 20, and does not show the seat back pad attached. The seat cushion frame 16 and the seat back frame 20 form a part of a frame structure 22, which also includes a head restraint portion 24. Attached to the head restraint portion 24 of the frame structure 22 is a release arrangement 26, which is described in more detail below. In at least one embodiment, the head restraint portion 24 is non-rotationally attached to the seat back frame 20 and does not pivot relative to it.

The release arrangement 26 includes a first flexible member 28, which in the embodiment shown in FIG. 1, is a pull-strap. The pull-strap 28 is configured as a flexible elongate member, and can be used by a vehicle occupant to move a latch arrangement 30 from a locked position to an open position. The release arrangement 26 also includes a second flexible member, which in the embodiment shown in FIG. 1 is a cable 32. The cable 32 is routed down a side of the seat back 14 and is connected to the latch arrangement 30 on the left side of the seat 10. A second cable 34 is positioned immediately adjacent to the cable 32 and is routed down the side of the seat back 14 and connected to a second latch arrangement 36 disposed on the right side of the seat 10, but which is not visible in FIG. 1.

FIG. 2A shows the latch arrangement 30 in detail. Specifically, the cable 32 is attached to a latch hook 38, which is shown in FIG. 2A mating with a striker 40, such that the latch arrangement 30 is in a locked position. In this position, pivoting of the seat back 14 relative to the seat cushion 12 is inhibited. FIG. 2B shows the latch arrangement 30 in an open position, wherein the latch hook 38 is disengaged from the striker 40, which facilitates pivoting of the seat back 14 forward relative to the seat cushion 12. To move the latch hook 38 from the engaged position as shown in FIG. 2A to the disengaged position as shown in FIG. 2B, a vehicle occupant can pull on the pull-strap 28—see FIG. 1—which tensions the pull-strap 28 and in turn tensions the cable 32.

Figure 4:
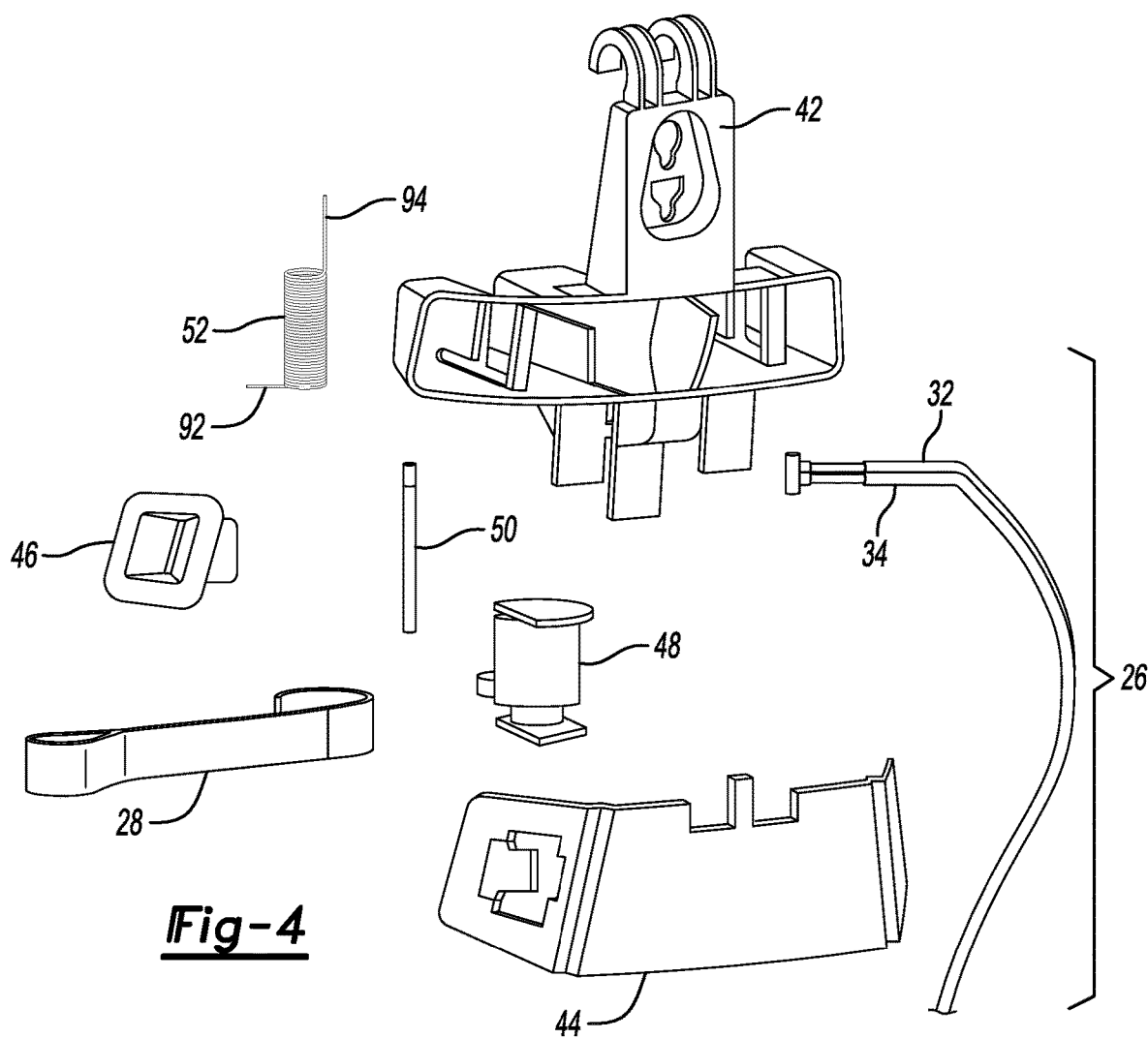
FIG. 4 shows an exploded view of the release arrangement.

FIG. 3 shows the release arrangement 26 detached from the head restraint portion 24 of the frame structure 22. The release arrangement 26 includes the pull-strap 28, as well as the cables 32, 34. It also includes a carrier 42, a cap 44 that covers a back portion of the carrier 42, and a cover 46, which provides an exit point for the pull-strap 28 from the carrier 42. The part of the frame structure 22 forming the head restraint portion 24, and the release arrangement 26, make up a head restraint for the seating system 10 shown in FIG. 1 without the cushion material or trim cover attached. FIG. 4 shows an exploded view of the release arrangement 26. In addition to the components described above, the release arrangement 26 includes a rotatable actuator 48 and an axle 50, which is disposed through the actuator 48 and holds it within the carrier 42. The release arrangement 26 also includes a biasing member, which in the embodiment shown in FIG. 4, is a torsion spring 52. As explained in more detail below, the spring 52 is disposed over a portion of the axle 50 and provides a torque to keep the latch arrangements 30, 36 in their locked positions when the pull-strap 28 is not tensioned.

Figure 5:
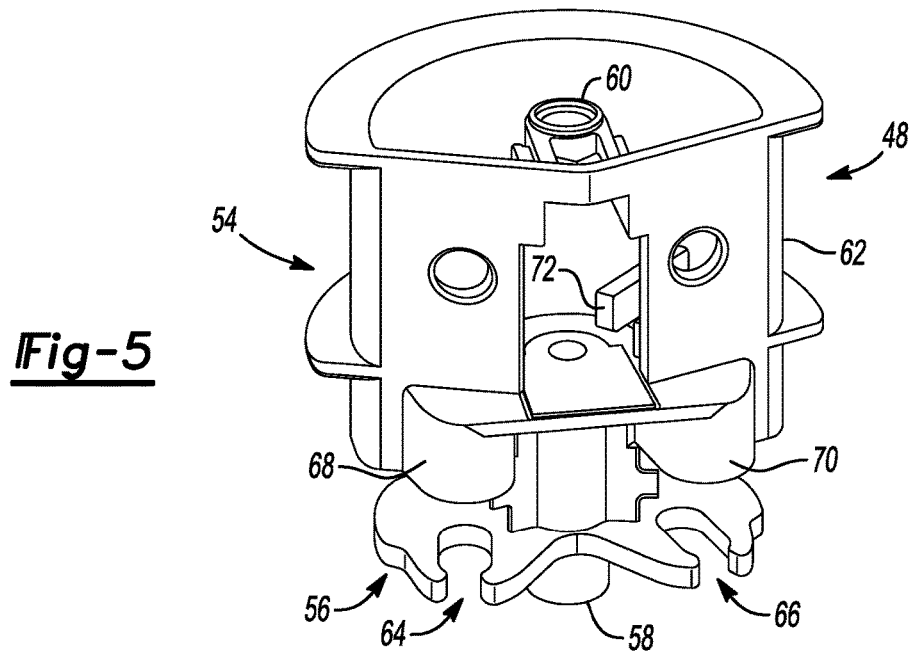
FIG. 5 shows a perspective view of a rotatable actuator making up a part of the release arrangement shown in FIG. 4.

FIG. 5 shows a perspective view of the rotatable actuator 48. The actuator 48 is a stepped-roller having first and second steps 54, 56, each of which defines a respective radius (R1), (R2)—see FIGS. 9 and 10. The first and second steps 54, 56 may also be considered first and second pulleys because they provide a rotating element for the pull-strap 28 and the cables 32, 34, respectively. The actuator 48 includes center portions 58, 60, each having an aperture disposed therethrough and configured to receive the axle 50 to attach the actuator 48 to the carrier 42. Thus, in the embodiment illustrated, the axle 50 is disposed through the first and second steps 54, 56 of the actuator 48. The first step 54 includes an arcuate surface 62 around which the pull-strap 28 will wrap when it is attached to the actuator 48. The second step 56 includes open receiving portions 64, 66 and closed receiving portions 68, 70 for receiving an end of the cables 32, 34.

Figure 6:
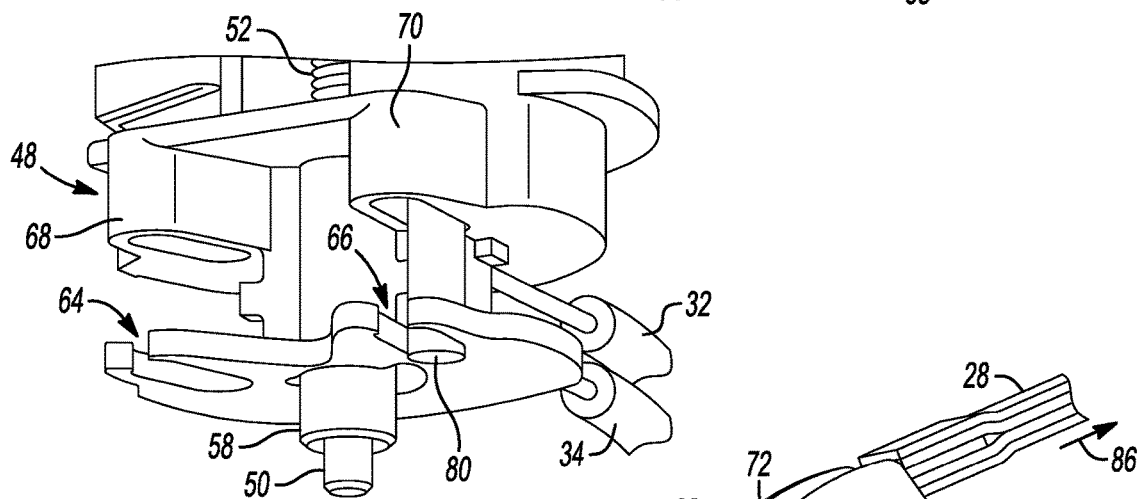
FIG. 6 shows the rotatable actuator attached to a Bowden cable.
Figure 7:
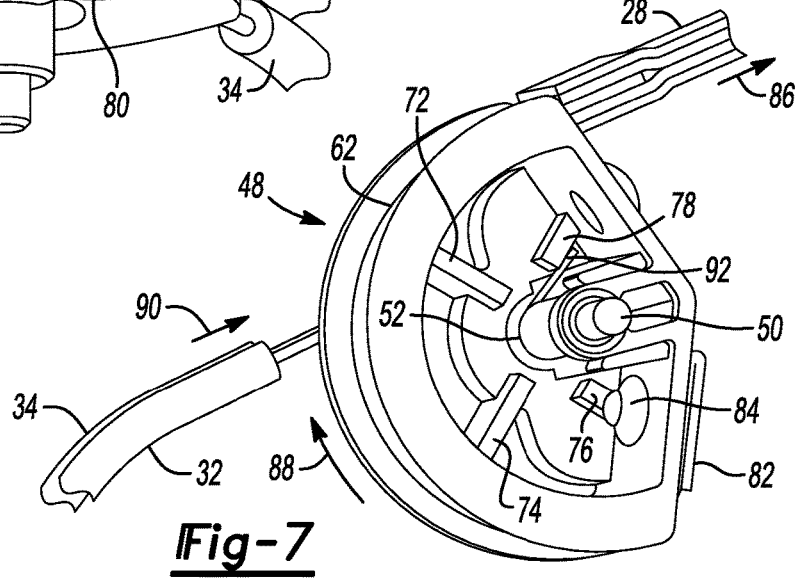
FIG. 7 shows a pull-strap, a Bowden cable, and a torsion spring attached to the rotatable actuator.

The actuator 48 also includes a projection 72 shown in FIG. 5, and several other projections 74, 76, 78 shown in FIG. 7. FIG. 6 shows a lower portion of the actuator 48, and in particular, illustrates an end 80 of the cables 32, 34 secured within the open receiving portion 66 and the closed receiving portion 70. As shown in FIG. 6, the axle 50 is disposed through the center portion 58 of the actuator 48. A portion of the spring 52 is also visible in FIG. 6, and is explained in more detail below in conjunction with FIG. 7. In the embodiment illustrated in the various drawing figures, and in particular FIGS. 5-7, the actuator 48 is symmetrical about the center portions 58, 60. For example, the seating system 10 illustrated in FIG. 1 is configured to be installed on the left side of a vehicle, and that is why the pull-strap 28 extends outward from the carrier 42 toward the left side of the seat back 14. But because of the actuator 48 is a symmetrical about its center, it can also be used in a seating system configured for installation on the right side of the vehicle, such that the pull-strap will exit the carrier toward the right side of the seat back.

FIG. 7 shows the actuator 48 from above, disconnected from the carrier 42 and other elements of the release arrangement 26. As shown in FIG. 7, the pull-strap 28 wraps around the arcuate surface 62 of the actuator 48, and an end 82 of the pull-strap 28 is attached to the actuator 48 by a fastener 84, which in this embodiment is a rivet. When the pull-strap 28 is tensioned—for example, by pulling it away from the carrier 42 in the direction shown by the arrow 86—the actuator 48 rotates around the axle 50 in a first direction—see the arrow 88—which causes the cables 32, 34 to be tensioned as indicated by the arrow 90. When the vehicle occupant releases the pull-strap 28, the spring 52 acts as a biasing member, applying a rotational bias to the actuator 48 in a second rotational direction opposite the first direction.

As shown in FIG. 7, the spring 52 is disposed over a portion of the axle 50, and includes an end 92 disposed against the projection 78 of the actuator 48. Returning to the exploded view of the release arrangement 26 shown in FIG. 4, the spring 52 includes a second end 94, which is configured to be held in place by a slot 96—see FIG. 8—in the carrier 42. Therefore, as the actuator 48 rotates when the pull-strap 28 is tensioned, the end 92 of the spring 48 also rotates because it is in contact with the projection 78. The other end 94 of the spring 52, however, is held in place by the carrier 42. Thus, the spring 52 increases its torsional resistance to the rotation of the actuator in the first direction, and imparts a torque in the second direction. This causes the actuator 48 to return to its initial position when the pull-strap 28 is released, which in turn removes tension from the cables 32, 34, and the latch arrangements 30, 36 are moved from the open position to the locked position. In order to keep the actuator 48 in a desired position, a small stop may be placed on the carrier 42 to ensure that the actuator 48 does not go beyond a certain point when rotating back in the second direction.

Figure 8:
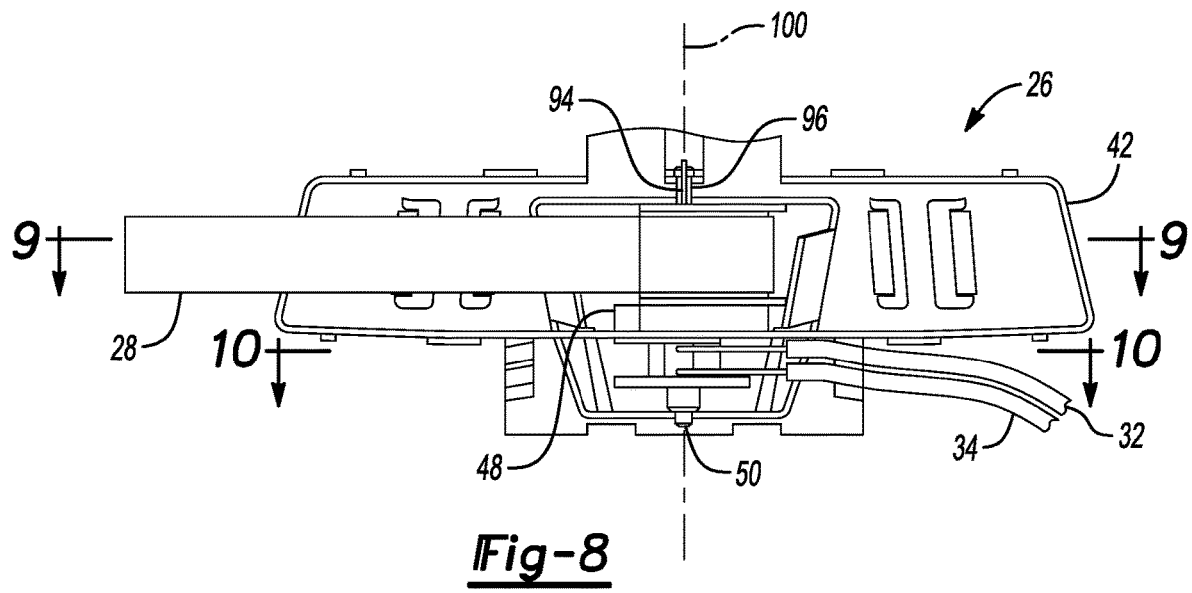
FIG. 8 shows a side view of a portion of the release arrangement shown in FIG. 4.

FIG. 8 shows a portion of the release arrangement 26 with two cut lines 9-9 and 10-10 going through different portions.

Figure 9:
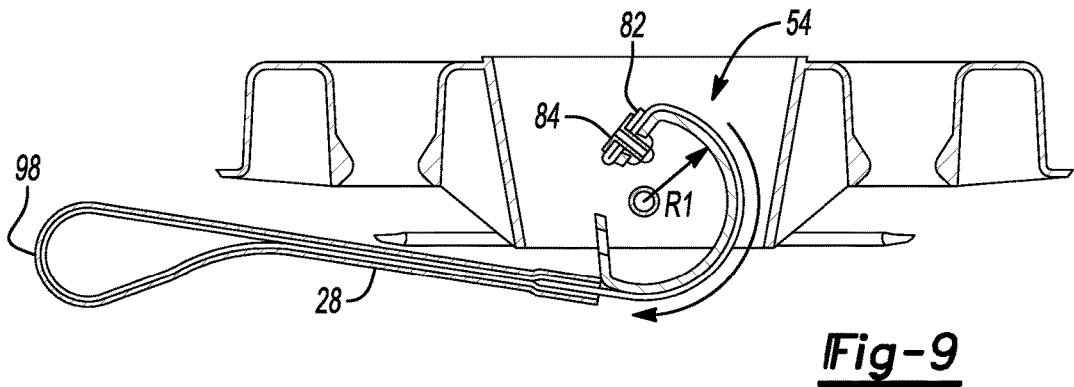
FIG. 9 shows a cross section of the release arrangement shown in FIG. 8.
Figure 10:
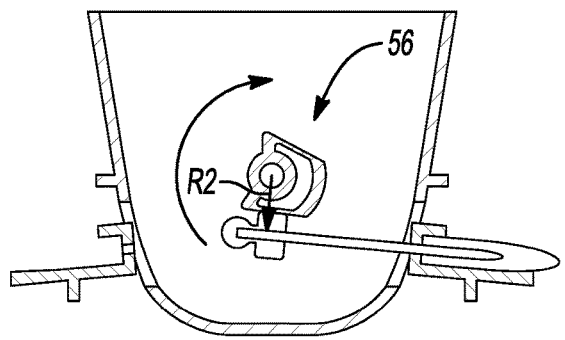
FIG. 10 shows a different cross section of the release arrangement shown in FIG. 8.

FIGS. 9 and 10 show the cross-sectional views through the cut lines 9-9 and 10-10, respectively. In each of FIGS. 9 and 10, the rotational arrow shows the direction of rotation in the first direction, for example, when the pull-strap 28 is tensioned. More specifically, a vehicle occupant may pull an end 98—which is formed in a loop in the embodiment shown in FIG. 9—of the pull-strap 48 away from the carrier 42, and because the other end 82 of the pull-strap 28 is affixed to the first step 54 of the actuator 48, the actuator 48 rotates around an axis 100 in the first direction. As shown in FIG. 9, the first step 54 has a radius (R1), and as shown in FIG. 10, the second step 56 has a radius (R2). Each of the radii (R1) and (R2) may be changed to adjust the force necessary to disengage the latch arrangements 30, 36 from the locked position to the open position. In the embodiments illustrated in the drawing figures, the radius (R2) of the second step 56 is smaller than the radius (R1) of the first step, which provides a mechanical advantage so that less force needs to be applied to the pull-strap 28 to disengage the latch arrangements 30, 36. In other embodiments, different ratios between the radii (R1) and (R2) may be used to meet the needs of the particular design.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seating system for a vehicle, comprising:
    a seat cushion;
    a seat back pivotably attached to the seat cushion;
    a latch arrangement having a locked position for inhibiting pivoting of the seat back relative to the seat cushion and an open position for facilitating pivoting of the seat back relative to the seat cushion; and
    a release arrangement including a first pulley rotatable around an axis, a second pulley connected to the first pulley and rotatable around the axis, a flexible elongate member wrapped around at least a portion of the first pulley, and a cable wrapped around at least a portion of the second pulley and having a portion attached to the latch arrangement such that tensioning the flexible elongate member rotates the first and second pulleys in a first direction and tensions the cable to move the latch arrangement from the locked position to the open position.

2. The seating system of claim 1, further comprising a frame structure, and wherein the release arrangement further includes a carrier attached to a portion of the frame structure, the first and second pulleys being rotationally disposed in the carrier.

3. The seating system of claim 2, wherein the carrier is attached to a head restraint portion of the frame structure, and the flexible elongate member has one end attached to the first pulley and one other end extending outward from the carrier.

4. The seating system of claim 2, wherein the flexible elongate member includes one end attached to the first pulley and one other end extending outward from the carrier such that moving the one other end away from the carrier tensions the flexible elongate member and rotates the first pulley in the first direction.

5. The seating system of claim 4, wherein the release arrangement further includes an axle disposed through the first and second pulleys along the axis and connected to the carrier, and a spring disposed over the axle and attached to the first pulley such that the spring applies a torque to the first pulley in a second direction opposite the first direction.

6. The seating system of claim 5, wherein the spring rotates the first and second pulleys in the second direction and removes tension from the cable to move the latch arrangement from the open position to the locked position when tension is released from the flexible elongate member.

7. A seating system for a vehicle, comprising:
    a seat cushion;
    a seat back pivotably attached to the seat cushion;
    a latch arrangement having a locked position for inhibiting pivoting of the seat back relative to the seat cushion and an open position for facilitating pivoting of the seat back relative to the seat cushion;
    a rotatable actuator defining a first radius and a second radius;
    a first flexible member attached to the rotatable actuator at the first radius such that tensioning the first flexible member rotates the rotatable actuator in a first direction; and
    a second flexible member attached to the latch arrangement and the rotatable actuator at the second radius such that rotation of the rotatable actuator in the first direction tensions the second flexible member and moves the latch arrangement from the locked position to the open position.

8. The seating system of claim 7, wherein the second radius is smaller than the first radius.

9. The seating system of claim 7, further comprising a carrier and an axle attached to the carrier and rotatable therein, the axle being disposed through the rotatable actuator such that the rotatable actuator can rotate relative to the carrier.

10. The seating system of claim 9, further comprising a frame structure including a head restraint portion having the carrier attached thereto, and wherein the first flexible member has one end attached to the rotatable actuator and one other end extending outward from the carrier.

11. The seating system of claim 9, further comprising a frame structure having the carrier attached thereto, and wherein the first flexible member includes one end attached to the rotatable actuator at the first radius and one other end extending outward from the carrier such that moving the one other end away from the carrier tensions the first flexible member and rotates the rotatable actuator in the first direction.

12. The seating system of claim 9, further comprising a biasing member connected to the rotatable actuator and configured to apply a rotational bias to the rotatable actuator in a second direction opposite the first direction.

13. The seating system of claim 12, wherein the biasing member includes a torsion spring disposed over a portion of the axle.

14. A seating system for a vehicle, comprising:
    a seat cushion;
    a seat back pivotably attached to the seat cushion;
    a latch arrangement operable between a locked position for inhibiting pivoting of the seat back relative to the seat cushion and an open position for facilitating pivoting of the seat back relative to the seat cushion; and
    a release arrangement operable to move the latch arrangement between the locked position and the open position and including an actuator having a first step defining a first radius and a second step defining a second radius, a first flexible member attached to the first step such that tensioning the first flexible member rotates the actuator around an axis in a first direction, and a second flexible member attached to the second step and the latch arrangement such that rotation of the actuator in the first direction around the axis tensions the second flexible member and operates the latch arrangement.

15. The seating system of claim 14, further comprising a frame structure, and wherein the release arrangement further includes a carrier attached to a portion of the frame structure and having the actuator rotationally disposed therein.

16. The seating system of claim 15, wherein the carrier is attached to a head restraint portion of the frame structure, and the first flexible member has one end attached to the first step and one other end extending outward from the carrier.

17. The seating system of claim 15, wherein the first flexible member includes one end attached to the first step and one other end extending outward from the carrier such that moving the one other end away from the carrier tensions the first flexible member and rotates the actuator in the first direction.

18. The seating system of claim 15, wherein the frame structure includes a seat back frame and a head restraint portion non-rotationally attached to the seat back frame.

19. The seating system of claim 15, wherein the release arrangement further includes an axle disposed through the actuator along the axis and connected to the carrier, and a spring disposed over the axle and attached to the actuator such that the spring applies a torque to the actuator in a second direction opposite the first direction.

20. The seating system of claim 19, wherein the torque applied by the spring to the actuator in the second direction rotates the actuator in the second direction and removes tension from the second flexible member to operate the latch arrangement from the open position to the locked position when tension is released from the first flexible member.

* * * * *